UNITED STATES PATENT OFFICE.

ISIDOR KLIMONT, OF VIENNA, AUSTRIA-HUNGARY, ASSIGNOR TO EMANUEL KHUNER & SOHN, OF VIENNA, AUSTRIA-HUNGARY.

PROCESS OF PURIFYING FATS.

SPECIFICATION forming part of Letters Patent No. 719,014, dated January 27, 1903.

Application filed March 4, 1902. Serial No. 96,693. (No specimens.)

*To all whom it may concern:*

Be it known that I, ISIDOR KLIMONT, a subject of the Emperor of Austria-Hungary, residing at Vienna, in the Empire of Austria-Hungary, have invented certain new and useful Improvements in Processes of Purifying Fats and Fatty Substances, of which the following is a specification.

My invention relates to the purification of animal or vegetable fats, and has for its object an improved process for removing from such fats all substances which may cause their rancidity. The cause of such animal or vegetable fats which have not been subjected to any chemical process of purification becoming rancid is principally to be found in the presence of albuminous substances, while in such fats which have been treated chemically after one of the known methods of purification rancidity may result from the presence of substances produced during the process of purification—such as, for instance, sebacic-acid salts.

For removing the sebacic-acid salts, as well as albuminous substances, I proceed as follows: For removing the sebacic-acid salts from the fat the latter is treated with such alkaline-earth compounds as are completely or partly soluble in water—as, for instance, hydroxid of calcium, chlorid of calcium, and such like—whereby sebacic-acid salts insoluble in water are precipitated, while the clear oil may be filtered off. For removing the albuminous substances the fat or oil to be treated is kept for some time in a vessel at a temperature above 100° centigrade, which causes the albuminous substances to precipitate. The heating process may be carried out in either open or closed vessels under the ordinary atmospheric pressure or in a vacuum, or the air may be substituted by an indifferent gas—such as, for instance, carbonic-acid gas.

In practically carrying out this process, for instance, five hundred pounds of oil are mixed with twenty pounds of concentrated solution of soda and stirred until the sebacic acids are neutralized, whereupon the lye at the bottom of the vessel is drawn off and the oil is washed with water and then separated from the latter. The product thus obtained is mixed with about twenty-two pounds of chlorid of calcium, which has previously been dissolved in a small quantity of water, whereby the sebate of calcium and chlorid of sodium are precipitated and may be separated from the oil by filtration. The oil thus obtained is heated for about one hour and carbonic-acid gas is blown through it, whereby the albuminous substances are perfectly precipitated.

Having described my invention, what I claim, and wish to secure by Letters Patent, is—

The herein-described process for purifying fats, which consists in mixing therewith a concentrated solution of soda, agitating the mixture to neutralize the sebacic acids, drawing off the lye at the bottom, washing the fats with water, separating the fats from the water, mixing with the separated fats a solution of a compound of an alkaline earth, filtering the fats, and finally subjecting the same for a time to a temperature above the boiling-point of water, substantially as described.

In testimony whereof I affix my signature.

ISIDOR KLIMONT.

In presence of—
FRIEDERICH BINDER,
ALVESTO S. HOGUE.